L. P. HALLADAY.
STEERING WHEEL.
APPLICATION FILED MAY 29, 1914.
1,159,019.
Patented Nov. 2, 1915.
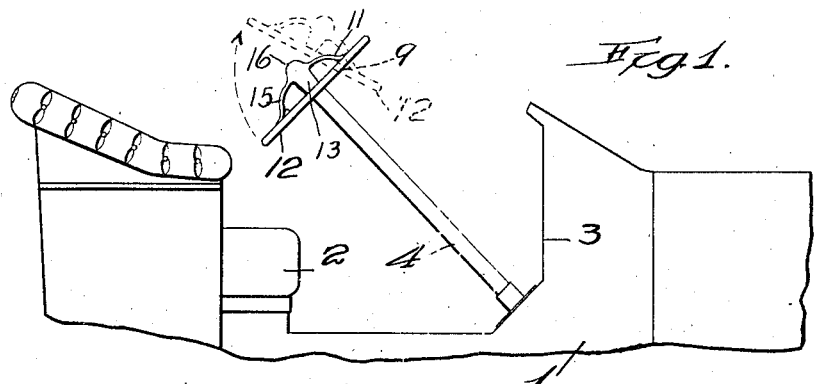
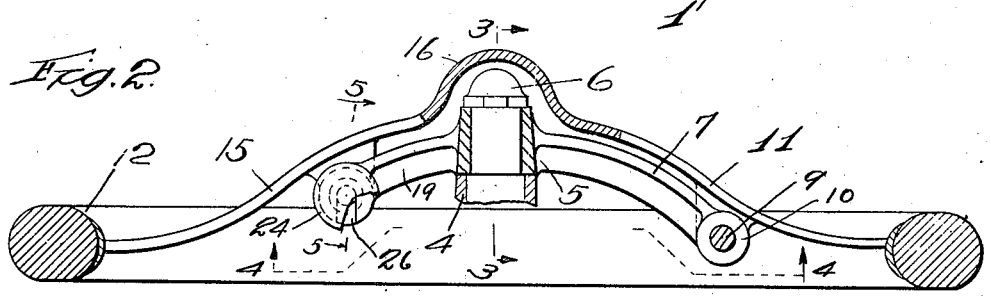
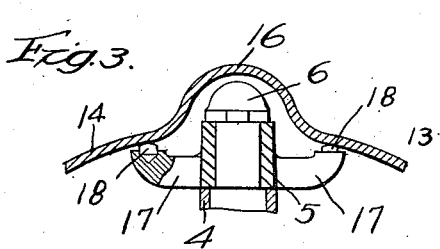
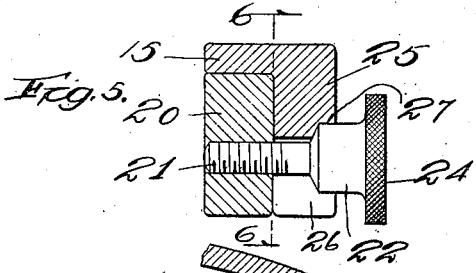
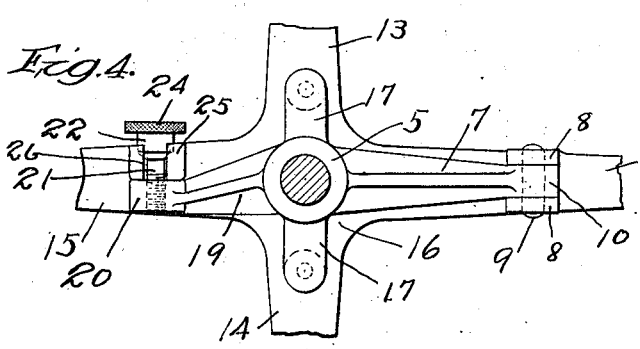
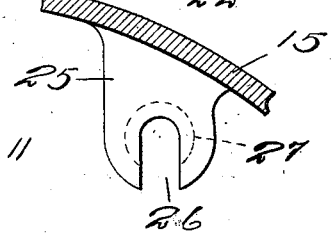
Witnesses:
Inventor:
Lewis P. Halladay.
by Parker & Carter
his Attys

UNITED STATES PATENT OFFICE.

LEWIS P. HALLADAY, OF STREATOR, ILLINOIS.

STEERING-WHEEL.

1,159,019.  Specification of Letters Patent.  Patented Nov. 2, 1915.

Application filed May 29, 1914. Serial No. 841,745.

*To all whom it may concern:*

Be it known that I, LEWIS P. HALLADAY, a citizen of the United States, residing at Streator, in the county of La Salle and State of Illinois, have invented a certain new and useful Improvement in Steering-Wheels, of which the following is a specification.

My invention relates to improvements in steering wheels for automobiles and the like.

It is illustrated more or less diagrammatically in one form in the accompanying drawing, wherein—

Figure 1 shows a detail in part section of a fragment of an automobile seat steering column and wheel; Fig. 2 is a section through the steering wheel; Fig. 3 is a section along line 3—3 of Fig. 2; Fig. 4 is a section along line 4—4 of Fig. 2; Fig. 5 is a section along line 5—5 of Fig. 2; Fig. 6 is a section along line 6—6 of Fig. 5.

Like parts are indicated by like letters in all the figures.

1 is the automobile frame, 2 is the seat, 3 the dash, 4 the steering column, 5 a steering wheel spider rigidly mounted on the end of the column held in position thereon by the cap screw 6. This spider has a long arm 7, at the end of which is a lug 10. This lug carries a pivot 9 upon which is rotatably mounted the lugs 8—8. The lugs 8—8 project downwardly from and are rigid on a wheel arm or spoke 11 forming part of a steering wheel 12. This steering wheel has three additional spokes 13, 14, 15, which spokes meet the spoke 11 at a recessed boss 16 overlying the cap screw 6. The spider 5 has projecting from its opposed sides the arms 17 provided with resilient contact buttons of rubber or other suitable material 18 in engagement with the under sides of the steering wheel arm 13, 14.

19 is a locking arm projecting from the spider 5 which terminates in a lug 20. In this lug is screw-threaded a lock screw 21 terminating in a locking cylinder 22 and hand wheel 24.

25 is a guide lug projecting downwardly from the spoke 15 in slidable engagement with one side of the lug 20 slotted at 26 to permit passage of the screw 21 and recessed or countersunk at 27 to engage the cylinder 22 so that when the parts are in the position shown and the locking screw is turned up the cylinder thereon engages the countersink in the lug and the wheel is held in fixed position with respect to the spider both by frictional contact between the two lugs and also by the positive engagement of the screw with the lug on the wheel. When in the position shown the steering wheel operates exactly as an ordinary wheel fixed on the steering column. When, however, the operator desires to leave his seat, he unscrews the screw sufficiently to release it from its engagement with the lug on the wheel, rotates the wheel about the pivot 9 in the direction shown in the arrow and is then free to leave his seat without being interfered with by the presence of the wheel.

It will be noted that while I have shown in my drawing an operative device, still many changes might be made in size, shape and arrangement of parts without departing materially from the spirit of my invention. I wish, therefore, that my drawing be considered as in a sense diagrammatic.

I claim:

A steering wheel comprising a rim, a plurality of radially arranged spokes supporting the rim, an upwardly convexed hollow box at the center of the wheel, a steering column, a spider rigidly mounted on the column having a long, forwardly projecting arm, a lug on one of the wheel spokes pivoted on the forwardly projecting arm of the spider, the spider having a rearwardly projecting arm, a lug carried by one of the wheel spokes adapted to engage the end of said arm, and a locking device adapted to lock the lug and the end of the arm together, cross arms projecting outwardly from either side of the center of said spider, yielding contact members carried thereby and in engagement with two of the wheel spokes.

In testimony whereof, I affix my signature in the presence of two witnesses this 20th day of May 1914.

LEWIS P. HALLADAY.

Witnesses:
 FRED C. BERTIAUX,
 LOUIS NATER.